United States Patent Office 3,073,135
Patented Jan. 15, 1963

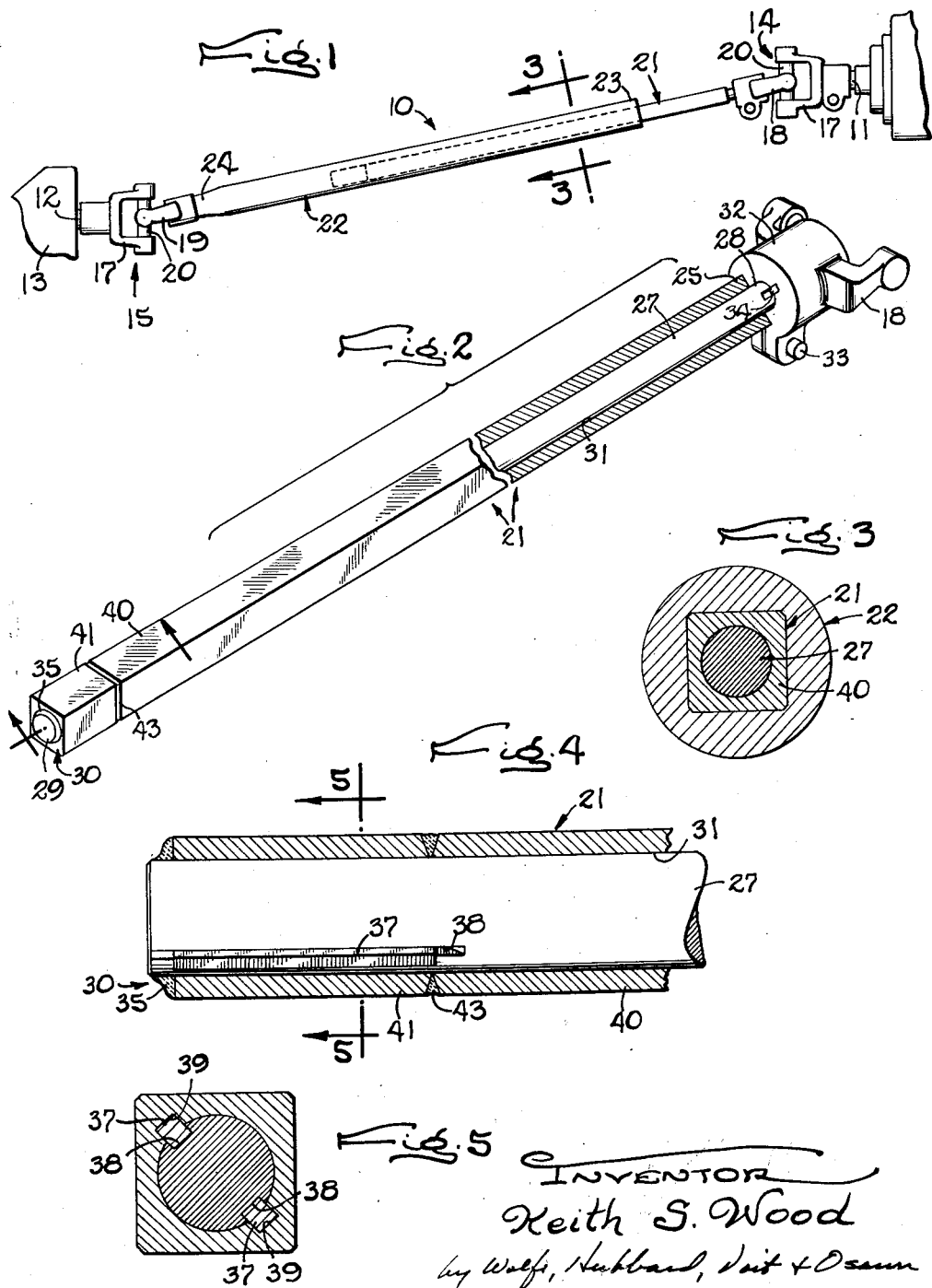

3,073,135
EXTENSIBLE SHAFT
Keith S. Wood, Oregon, Ill., assignor to Wood Brothers Manufacturing Company, Oregon, Ill., a corporation of Illinois
Filed Dec. 18, 1961, Ser. No. 160,204
8 Claims. (Cl. 64—23)

This invention relates to extensible drive shafts of the type including two telescoping sections with connecting members such as universal joints mounted on opposite ends of the shaft.

The general object of the present invention is to provide a relatively simple, inexpensive and rugged shaft of the above character which is constructed in a novel manner to absorb and cushion sudden increases in the torque load on the shaft thereby to prevent damage to the shaft and the driving and driven members.

A more specific object is to incorporate a resiliently flexible torsion bar in the shaft in a novel manner such that the bar is braced against radial deflection and vibration while being free to twist and absorb torque loads.

Other objects and advantages of the invention will become apparent from the following detailed description taken in connection with the accompanying drawing, in which FIGURE 1 is a fragmentary side elevational view of a shaft embodying the novel features of the present invention.

FIG. 2 is an enlarged perspective view of one section of the shaft shown in FIG. 1 with part of the view being broken away and shown in section.

FIG. 3 is an enlarged fragmentary sectional view taken along the line 3—3 of FIG. 1.

FIG. 4 is an enlarged fragmentary sectional view taken along the line 4—4 of FIG. 2.

FIG. 5 is an enlarged fragmentary sectional view taken along the line 5—5 of FIG. 4.

As shown in the drawing for purposes of illustration, the invention is embodied in a drive shaft 10 for connecting a driving member such as the power take-off shaft 11 of a tractor (not shown) and a driven member such as a shaft 12 journaled in the gear box 13 of a rotary mower (not shown) pulled by the tractor, the shaft being axially extensible to accommodate relative vertical and horizontal movement between the tractor and implement shafts. Mounted on the ends of the shaft 10 are connecting elements 14 and 15 preferably comprising universal joint assemblies of well known construction including yokes 17 fast on the shafts 11 and 12, yokes 18 and 19 on opposite ends of the shaft 10, and crosses 20 effecting swivel connections between the yokes 17 and the yokes 18 and 19.

To permit relative axial displacement of the ends of the shaft 10, the latter is formed in two coaxial telescoping sections 21 and 22 of approximately the same length, one section 22 comprising a tubular sleeve open at one end 23 and telescoped over the other section 21. The yoke 19 is carried on the other end 24 of the sleeve. Means is provided for preventing relative rotation of the sections 21 and 22 while permitting relative axial sliding thereof as the joints 14 and 15 move together or apart. Herein, the interior of the sleeve 22 is of angular cross-section, at least adjacent the open end 23, and the exterior of the section 21 is of corresponding but slightly smaller cross-section so that the flat, axially extending side surfaces of the section 21 and the interior surfaces of the sleeve 22 constitute the means for preventing relative rotation, the surfaces sliding freely back and forth relative to each other in axial directions but interlocking when the sections tend to rotate. Preferably, both the section 21 and the interior of the sleeve are square in cross-section.

The present invention contemplates a relatively simple, inexpensive and rugged extensible drive shaft 10 which is constructed in a novel manner to absorb and cushion sudden increases in the torque load on the shaft. To achieve these ends, the section 21 also is formed as a sleeve open at one end 25 and a resiliently flexible torsion bar 27 is rotatably supported within the sleeve with one end portion 28 projecting beyond the outer end 25 and fastened to the joint 14. Adjacent the inner end 29 of the bar, the latter is rigidly secured to the sleeve 21 by a connection 30 spaced a substantial distance from the outer end 25 of the sleeve.

With this arrangement, torque is transmitted from the joint 14 to the sleeve 21 through the torsion bar 27 and the connection 30, and from the sleeve 21 to the joint 15 through the sleeve 22 and the abutting surfaces of the two sleeves. Under sudden changes in the torque load on the shaft, the bar 27 is free to twist between the connection 30 and the joint 14 thereby absorbing and cushioning a substantial portion of the torque differential and preventing damage to the shaft and joints. While the flexible bar is free to yield under torsion, it is effectivley braced by the sleeve 21 against radial deflection and vibration under the centrifugal force resulting from rotation of the shaft.

In the present instance, the torsion bar 27 is of circular cross-section and is composed of a suitable material having a high torsional resilience. To permit the bar to twist within the sleeve 21, the internal opening in the latter preferably comprises a cylindrical axial bore 31 of slightly greater diameter than the diameter of the bar. Herein, the bore extends completely through the sleeve so that the latter is open at both ends, and the bar is made somewhat longer than the sleeve to project outwardly from both ends thereof.

To fasten the outer end 28 of the torsion bar to the yoke 18, the body of the yoke is formed as a split sleeve 32, telescoped over the end of the bar, and clamped around the bar by means of a fastener 33. A key 34 (FIG. 2) seated between the sleeve and the bar insures a rigid connection between the yoke and the bar.

At the opposite end 29, the bar is secured to the sleeve by the connection 30 which herein includes a weld 35 (FIGS. 2 and 4) encircling the end of the bar and joining the latter to the end of the sleeve, and keys 37 seated in axially extending keyways formed by alined grooves 38 and 39 in the bar and in the adjacent surface of the sleeve respectively. Thus, the end of the bar is rigidly held both against turning and sliding endwise relative to the sleeve.

For ease of manufacture and assembly, the sleeve 21 may be formed in two separate pieces 40 and 41 with the internal grooves 39 milled in the short end piece 41. When the latter has been telescoped over the end of the bar and the keys 37 seated in the keyways, the weld 35 is completed to secure the bar to the end piece 41 and close the ends of the keyways. Then, the longer piece 40 of the sleeve is telescoped over the bar from the other end and welded at 43 to the short piece 41 to join the two pieces rigidly together.

When the bar and the sleeve 21 have been assembled with the yoke 18 mounted on the exposed end portion of the bar, the sleeve 21 is telescoped into the sleeve 22 and the shaft 10 is ready for operation. During operation, the bar transmits torque from the joint 14 to the sleeve 21 to drive the mower while remaining free to twist and absorb any sudden torque shocks such as would occur if the mower blade momentarily engages an obstruction. By cushioning the shock, the shaft reduces the likelihood of damage to the mower or the joints thereby eliminating the need for shear pins, slip clutches, and the like.

With the shaft constructed as herein described, the torsional forces are distributed over a bar of substantial length, and a relatively flexible bar may be used without danger of excessive bending under the weight of the shaft or of excessive vibration resulting from the centrifugal force developed in operation, the bar being braced by the sleeve 21 over all but a very small portion of its length. Thus, the shaft is simple, inexpensive, and rugged in construction and operation while effectively cushioning excessive torque loads.

I claim as my invention:

1. An extensible shaft comprising a first elongated tubular sleeve open at one end and having a rectangular internal cross-section, a connecting element mounted on the other end of said sleeve, a second elongated tubular sleeve open at one end and being of rectangular external cross-section, said second sleeve being telescoped into said first sleeve, a cylindrical bar disposed loosely within said second sleeve and substantially enclosed thereby with one end portion projecting outwardly therefrom, a connection adjacent the other end of said bar rigidly securing the latter to said sleeve, said bar being resiliently flexible and free to twist between said connection and said projecting end portion, and a second connecting element mounted on said projecting end portion adjacent the open end of said second sleeve, said bar transmitting torque from said second element to said connection and twisting to absorb torsional shocks.

2. An extensible shaft comprising a first elongated tubular sleeve open at one end, a connecting element mounted on the other end of the sleeve, a second elongated tubular sleeve open at one end with the other end thereof telescoped into said first sleeve, means for preventing relative rotation of said sleeves while permitting relative axial sliding, a cylindrical bar disposed loosely within said second sleeve and substantially enclosed thereby with one end portion projecting outwardly therefrom, a connection adjacent the other end of said bar rigidly securing the latter to said sleeve, said bar being resiliently flexible and free to twist between said connection and said projecting end portion, and a second connecting element mounted on said projecting end portion adjacent the open end of said second sleeve, said bar transmitting torque from said second element to said connection and twisting to absorb torsional shocks.

3. An extensible shaft comprising a first elongated tubular sleeve open at one end, a connecting member mounted on the other end of said sleeve, a second elongated tubular sleeve open at both ends, an elongated bar disposed loosely within said second sleeve and projecting outwardly from both ends thereof, said second sleeve being formed in two separate pieces, a connection rigidly securing one of said pieces to said bar adjacent one end of the latter, means rigidly joining said pieces, a second connecting element mounted on the other end of said bar, said second sleeve being telescoped into said first sleeve, and means for preventing relative rotation of said sleeves while permitting relative axial sliding, said bar being resiliently flexible under torsion to transmit torque between said second element and said connection while twisting to absorb torsional shocks.

4. An extensible shaft comprising a first elongated tubular sleeve open at one end, a connecting element mounted on the other end of said sleeve, a second elongated sleeve having an open end and an axial opening therein of circular cross-section, the other end portion thereof being telescoped into said first sleeve, a bar of circular cross-section slightly smaller than said axial opening and disposed within said second sleeve with one end portion projecting outwardly therefrom and the other end portion rigidly secured to the second sleeve at a point spaced a substantial distance inwardly from said open end, the interior of said first sleeve and the exterior of said second sleeve being of corresponding angular cross-section preventing relative rotation while permitting axial sliding of the sleeves, and a second connecting element mounted on said one end portion, said bar being resiliently yieldable under torsion to transmit torque between said second connection and said second sleeve while twisting to absorb torsional shocks.

5. An extensible shaft comprising a first elongated tubular sleeve open at one end, a connecting element mounted on the other end of said sleeve, a second elongated tubular sleeve having two open ends, said second sleeve being telescoped into said first sleeve, means for preventing relative rotation of said sleeves while permitting relative axial sliding, a bar disposed loosely within said second sleeve and projecting outwardly through said open ends, a connection rigidly securing said bar to said second sleeve adjacent one end of the latter, and a second connecting element mounted on the free end of said bar, said bar being resilient yieldable under torsion to transmit torque from said second element to said second sleeve while twisting to absorb torsional shocks.

6. An extensible shaft comprising a first elongated tubular sleeve open at one end, a connecting element mounted on the other end of said sleeve, a second elongated tubular sleeve having an open end, the other end portion thereof being telescoped into said first sleeve, means for preventing relative rotation of said sleeves while permitting relative axial sliding, a bar substantially enclosed within said second sleeve with one end portion of said bar projecting through said open end, means rigidly securing the other end of said bar to said second sleeve at a point spaced from said open end, and a second connecting element mounted on said one end portion, said bar being resiliently yieldable under torsion to transmit torque between said elements while twisting to absorb torsional shocks.

7. An extensible shaft comprising a first elongated tubular sleeve open at one end, a connecting element mounted on the other end of said sleeve, a second elongated tubular sleeve having an open end, the other end portion thereof being telescoped into said first sleeve, means for preventing relative rotation of said sleeves while permitting relative axial sliding thereof, a bar disposed loosely within said second sleeve having a free end portion adjacent said open end, means rigidly securing the other end portion of said bar to said second sleeve at a point spaced inwardly from said open end, and a second connecting element connected to the free end portion of said bar, said bar being resiliently yieldable under torsion to transmit torque between said elements while twisting to absorb torsional shocks.

8. An extensible shaft comprising two telescoping tubular sleeves, means for preventing relative rotation of said sleeves while permitting axial sliding thereof, a connecting element mounted on the free end of one of said sleeves, a resiliently flexible bar loosely disposed within the other sleeve having a free end portion disposed toward the free end of said other sleeve, a rigid connection between the other end portion of said bar and said other sleeve at a point spaced inwardly a substantial distance from the free end of the latter, and a second connecting element mounted on the said free portion of said bar whereby said bar transmits torque between said second element and said connection while being free to twist within said second sleeve and absorb torsional shocks.

References Cited in the file of this patent

UNITED STATES PATENTS

| 993,570   | Webster  | May 30, 1911 |
| 1,636,262 | Troendly | July 19, 1927 |
| 2,229,657 | Larason  | Jan. 28, 1941 |

FOREIGN PATENTS

| 691,281 | Great Britain | May 6, 1953 |